United States Patent [19]
Tomelleri

[11] 3,907,101
[45] Sept. 23, 1975

[54] ARTICHOKE TREATING MACHINE

[76] Inventor: Giordano Tomelleri, 22 Via Montorio, Verona, Italy

[22] Filed: Jan. 18, 1974

[21] Appl. No.: 434,653

[30] Foreign Application Priority Data
Jan. 22, 1973 Italy .................................. 84905/73

[52] U.S. Cl. .................... 198/266; 99/636; 99/643
[51] Int. Cl. ........................................... B65g 47/24
[58] Field of Search .......... 198/266, 20, 57; 99/643, 99/636

[56] References Cited
UNITED STATES PATENTS

| | | | |
|---|---|---|---|
| 2,974,699 | 3/1961 | Boles et al. ........................... | 99/636 |
| 3,113,574 | 12/1963 | Greedy et al. ...................... | 198/57 X |
| 3,277,940 | 10/1966 | Henderson et al. ................. | 198/266 |

*Primary Examiner*—Evon C. Blunk
*Assistant Examiner*—Douglas D. Watts
*Attorney, Agent, or Firm*—Steinberg & Blake

[57] ABSTRACT

The invention provides a machine which extracts artichokes one-by-one from a hopper, and conveys them individually on a conveyor device including grooved rollers, which rollers align the artichokes so that their axes are horizontal. Artichokes with their stems pointing in the wrong direction are manually or automatically reversed. Pincer arms remove the artichokes one-by-one from the conveyor at the end of its travel, and convey them to clamps on a wheel, where cutters are employed to trim the artichokes, whereafter they are released by the clamps to drop into a hopper. Both the conveyor and wheel movements are intermittent and synchronised.

6 Claims, 7 Drawing Figures

ARTICHOKE TREATING MACHINE

The invention refers to a machine for the preparation of artichoke hearts and in particular to devices therein for feeding and positioning the artichokes.

In known machines, the positioning of the artichokes thereon is effected by hand, since the correct position of the artichoke is the decisive element in avoiding imperfect products of poor commercial value. However, this involves considerable costs and slow production rates.

The object of the present invention is to avoid the above disadvantages, by providing a machine using a conveyor belt which brings the artichokes to a former in a duly arranged series, from which belt they are taken and disposed in the former in the correct position.

Other objects of the invention will become apparent from the following description, to be considered together with the accompanying drawings in which a preferred embodiment of the invention is illustrated schematically and in which.

The figures have been drawn to different scales, but the same or equivalent parts therein have the same numerical or alphabetical references.

Figure 1:
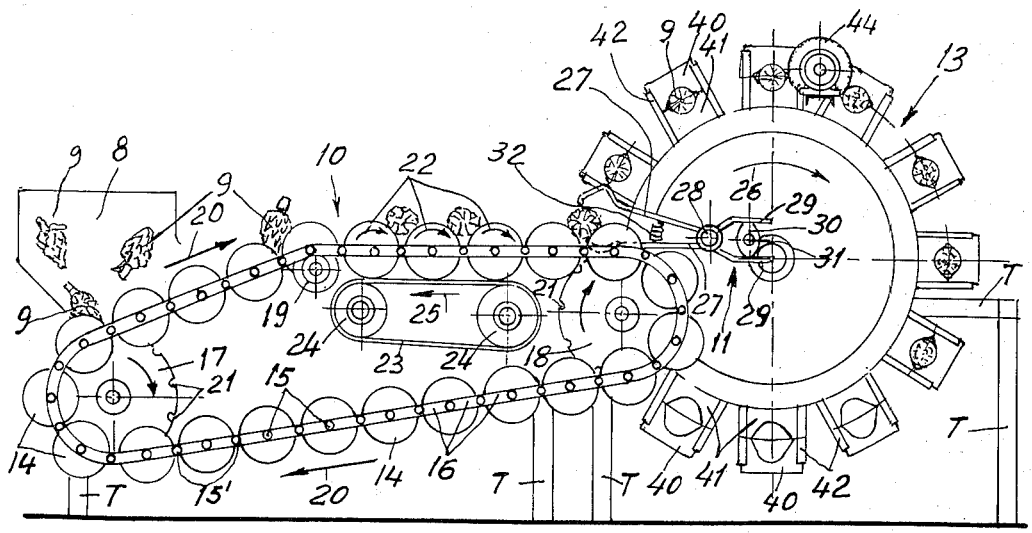
FIG. 1 shows a side view of an apparatus comprising means according to the invention, from which a side and part of the positioning device have been removed, various operating parts of machine.

With reference to FIG. 1, it will be seen that the apparatus comprises a frame T for the support of a hopper 8 for artichokes 9, a conveyor belt 10, a device 11 for gripping the artichokes, a positioning device 12 (see FIGS. 5, 6, 7) and an artichoke heart former 13.

From the hopper 8 the artichokes 9 drop on to the conveyor belt 10, formed by rollers 14, the pivots 15 of which represent parts of the connecting joints of link chains 16; these are supported by toothed wheels 17, 18, 19 at least one of which drives the chains and gives the belt 10 a forward movement in the direction of the arrows 20. The drive is from a motor not shown in the drawings. The link chains 16 have joints 15', between the rollers 14 which, like 15, engage in recesses 21 of the gear wheels 17, 18.

From the hopper 8 the belt 10 follows an upwardly inclined course and, during this travel, each pair of rollers 14 receives a single artichoke 9. The belt 10 then follows a horizontal path, along which a certain number of consecutive rollers 14 are rotated in the direction of the arrows 22 by the action of an endless belt 23, mounted on cylinders 24, one of which is driven by a motor M, giving (see FIG. 5) the belt 23 a uniform forward movement in the direction of the arrow 25.

The artichokes 9, deposited by the hopper 8 on the belt 10, may lie in any direction; however, when the rollers supporting them reach the horizontal path of belt 10, the artichokes are subjected to a movement of rotation in a direction opposite to that of the arrows 22. The artichokes 9 now become disposed with their longitudinal axis almost horizontal and parallel to the axis of the positioning device 12, not only because of the rotary motion imposed on them, but also because of the shape of the rollers 14. As may be clearly seen from FIGS. 5, 6, 7 the rollers 14 are in the form of a grooved pulley having a deep annular channel in the centre of the recess which, as will be explained hereinafter, serves to receive part of a jaw of the gripping device 11 (see FIG. 1). This configuration of the rollers 14 causes each pair to define a support seat, open at the bottom particularly suitable for rolling the artichokes into a horizontal position. Having reached this horizontal position, the artichokes 9 are conveyed by the belt 10 into proximity with a former 13 over a path during which the artichokes are held in their seats between the rollers 14, and a manual operator has sufficient time to check whether the stalks of the artichokes are all arranged in the same direction and to correct any wrong positioning.

It is obvious that this work by the manual operator may be obviated by using a lifting device (not shown), having the shape of the artichoke, which when it picks up a wrongly orientated product, brings pincers into operation which seize the artichoke, raise it, cause it to execute a rotation of 180°, and return it to its seat in the correct position.

The conveyor belt 10 is provided with an intermittent forward motion, the moving periods of which correspond to those of the intermittent rotation of the former 13, which is driven in the direction of the arrow 26 by a motor not shown in the drawings.

During the periods of intermittance, the gripping device 11 and the positioning device 12 come into operation. The gripping device 11, (see FIG. 1) is formed by a pair of jaws 27, pivoted at 28 and held in the open position by the elliptical cam 30, pivoted at 31, acting on the arms 29 forming an extension of the jaws 27.

The free ends of the jaws 27 are shaped to engage around an artichoke near its centre area between the stalk and the top, and the lower jaw is adapted to penetrate into the annular channel in the centre of the recess in the rollers 14 to reach below an artichoke 9.

Whilst the elliptical cam 30 executes a quarter-turn rotation, the arms 29 approach each other by the action of the spring 32 which causes the jaws 27 to grasp an artichoke. The artichoke is now held tightly between the jaws 27 by the partial rotation of part 11 around pivot 28, and made co-axial with the positioning device 12.

This positioning device (see FIG. 6) includes two cups 33—33' each connected by arms 34, 34' which may slide within support sleeves 35, 35' attached to the frame T of the machinery by levers 36, 36' pivoted respectively at 37, 37' and actuated by connecting rods 38, 38'.

Figures 2, 3, 4:
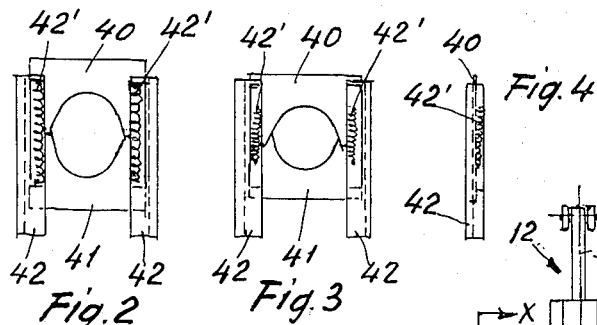
FIG. 2 shows a front view of supporting and locking elements, in the opening position, for a single artichoke.
FIGS. 3 and 4 show front and side views respectively of the members of FIG. 2, in the closed position.

When an artichoke is made co-axial with the positioning device 12, the connecting rod 38 exerts traction on lever 36 which displaces arm 34 in the direction shown by the arrow 39, moving the cup 33 to pass between the pair of jaws 40, 41 of the former 13 engaged therein. Each pair of jaws 40, 41 of former 13 slides within guides 42 and is held in the open position, see FIG. 2, by a device not shown in the drawings, which overcomes the force of the opposiing spring 42' which tends to keep the jaws 40, 41 in the closed position, see FIGS. 3 and 4.

Action similar to that of the connected rod 38, but of much less amplitude, is effected by the connecting rod 38' such that an artichoke 9', co-axial with the positioning device 12 (see FIG. 7), is simultaneously engaged by the cups 33, 33'. At the end of this phase of operation of the device 12, the cam 30 executes a further quarter-turn rotation and acts on the arms 29 which, overcoming the action of the opposing spring 32, opening the jaws 27 whereby the artichoke 9' remains supported only by the cups 33—33'.

Figure 5:
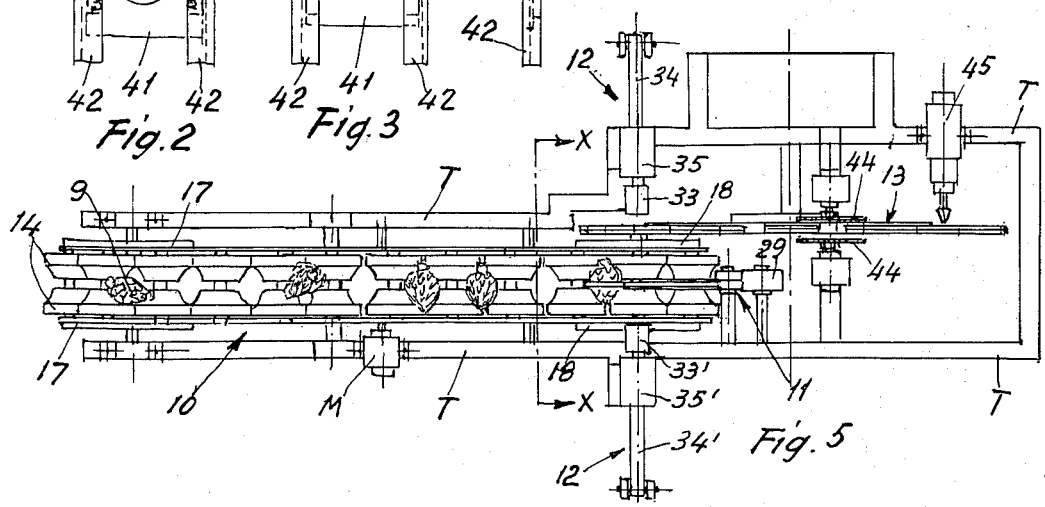
FIG. 5 shows a plan view of FIG. 1 but including the parts that have been removed from FIG. 1, FIGS. 6 and 7 show partial front views taken on the line x — x of FIG. 5 of the members of the positioning device in two different positions.
Figures 6, 7:
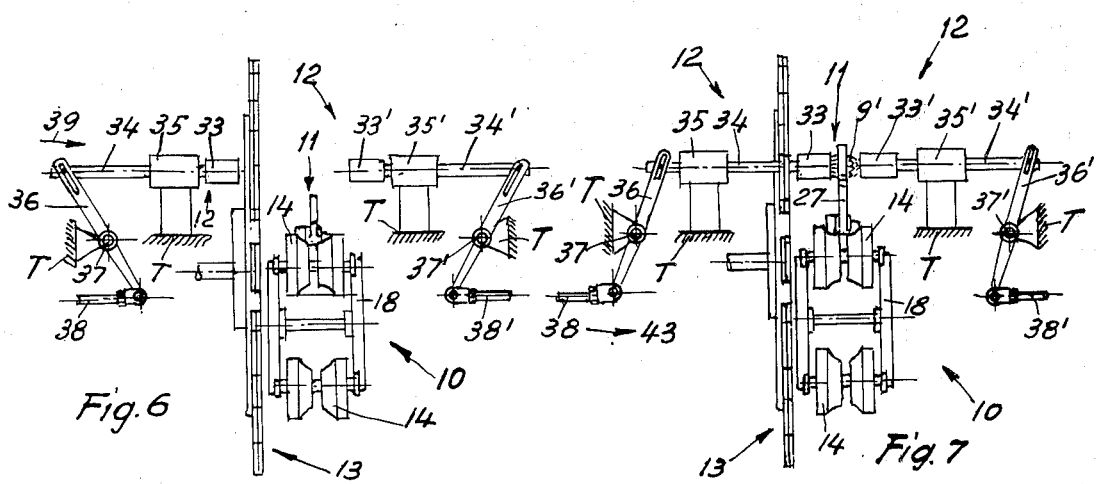

The connecting rods 38, 38' then act simultaneously in the direction of the arrow 43 shown in FIG. 7, to bring the artichoke 9' to the former 13, disposing it with its centre area between the open pairs of jaws 40, 41 (see FIG. 2) which close (see FIGS. 3 and 4) to lock the artichoke 9' in the correct position to be subjected to subsequent processing by the former 13. The device 11 then turns to the position shown in FIG. 5 and the device 11 to the position shown in FIG. 1, and subsequent forward movement of the belt 10 brings another artichoke into such a position that it can be gripped by the jaws 27, whilst the former 13 advances by one step and a new pair of jaws 40, 41, in the open position, is disposed co-axially with the device 12 to begin the positioning cycle of the next artichoke as described above.

Although not illustrated in the Figures, the cups 33, 33' may have different inner diameters in accordance with the size and shape of the artichokes and therefore the bottoms of said cups can be close to or remote from the openings of the cups to accommodate the heights and shapes of the artichokes. This coincides with the operating devices of the former which are adjustable also into suitable positions for operating on series of artichokes of different dimensions and shapes.

The conveyor belt 10 near the hopper 8 can be immersed in a tank, not shown in the drawings, full of water, in which the artichokes float and are urged in the direction of the conveyor belt 10 to be loaded thereon by means of one or more jets of water.

Once an artichoke has been gripped between the jaws 40, 41, the former 13 then proceeds with its clipping and topping by means of two cutters indicated by 44 in FIGS. 1 and 5, proceeding then with the twisting of the stalk by means of a device indicated by 45 in FIG. 5. From the latter the heart of the artichoke may be subjected to division into two or more parts before being released by the jaws 40, 41 by means of a device having separating blades.

We claim:

1. An artichoke treating machine including a hopper supplying artichokes to a feeding device, and a former following said feeding device, said former comprising first automatic means taking artichokes from said feeding device and second automatic means adapted to position said artichokes within said former, said feeding device comprising a conveyor belt having rollers each shaped like a grooved pulley and with an annular channel in the centre of said groove, means for driving said belt with an intermittent forward motion including at least one chain deriving its motion from at least one gearwheel meshing with the links of said chain, means for rotating said rollers during the passage along a horizontal portion of the path of said conveyor belt during said intermittent advancing periods of said belt, said former including an artichoke gripping device including pincers with gripping jaws, a cam and an opposing spring actuating the arms of said jaws; means aligning the free ends of said jaws coaxially with positioning device; and a positioning device including two cups supported by arms sliding in sleeves, and lever mechanisms actuating said arms for taking an artichoke from the jaws of said pincers and transferring to further jaws gripping said artichoke on said former.

2. An artichoke machine as recited in claim 1, wherein said means for rotating said rollers along a part of said horizontal path of said conveyor belt include an endless belt which drives the rollers by friction between said rollers and the material of said belt, and means for continuously driving said belt in a direction opposite that of the forward movement of said conveyor belt.

3. An artichoke machine as recited in claim 2, wherein said conveyor belt is associated with a lifting device and a correcting device for wrongly positioned artichokes.

4. An artichoke machine as recited in claim 3, wherein said device correcting the positioning of said artichokes includes a pincer which grips, raises and rotates an artichoke through 180°, and then returns said artichoke to its seat in the correct position.

5. An artichoke machine as recited in claim 1, wherein said devices engaging and positioning said artichoke effect all their movements during the intermittent period in the advance of said conveyor belt.

6. An artichoke machine as recited in claim 1 including means providing an intermittent advance motion having periods coincident with those of said conveyor belt.

* * * * *